(12) United States Patent
Kuffel et al.

(10) Patent No.: US 6,599,549 B1
(45) Date of Patent: Jul. 29, 2003

(54) DRY MIX CONTAINING BROWN SUGAR SUBSTITUTE

(75) Inventors: Richard Kuffel, Plymouth, MN (US); John G. Roufs, Maple Grove, MN (US); Kirby D. Hayes, West Lafayette, IN (US); Rita Nordness, Golden Valley, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 09/589,555

(22) Filed: Jun. 7, 2000

(51) Int. Cl.7 ............................................. A21D 10/00
(52) U.S. Cl. .................. 426/549; 426/96; 426/99; 426/103; 426/554; 426/555
(58) Field of Search ................... 426/94, 549, 554, 426/555, 98, 99, 103, 96

(56) References Cited

U.S. PATENT DOCUMENTS

| | | | | |
|---|---|---|---|---|
| 2,975,059 A | * | 3/1961 | Andrews | 426/555 |
| 3,170,796 A | * | 2/1965 | Andre et al. | 426/554 |
| 3,468,667 A | | 9/1969 | Chandler et al. | 99/2 |
| 3,551,166 A | * | 12/1970 | Baum et al. | 426/99 |
| 3,698,917 A | | 10/1972 | Baum et al. | 99/141 |
| 3,959,498 A | | 5/1976 | Lyall et al. | |
| 4,013,482 A | | 3/1977 | Jaconelli | 127/9 |
| 4,159,210 A | * | 6/1979 | Chen et al. | 426/98 |
| 4,252,831 A | | 2/1981 | Gleckler et al. | 426/74 |
| 4,732,767 A | | 3/1988 | Seiden et al. | 426/94 |
| 4,824,681 A | | 4/1989 | Schobel et al. | 426/5 |
| 4,915,971 A | | 4/1990 | Fennema et al. | 426/578 |
| 4,965,076 A | | 10/1990 | Martin et al. | |
| 5,084,288 A | * | 1/1992 | Yamamoto et al. | 426/554 |
| 5,084,294 A | * | 1/1992 | Schroeder et al. | 426/554 |
| 5,458,890 A | | 10/1995 | Williford et al. | 426/3 |
| 5,518,744 A | | 5/1996 | Kaeser et al. | 426/90 |
| 5,738,900 A | | 4/1998 | Cuadrado et al. | 426/658 |

FOREIGN PATENT DOCUMENTS

| | | |
|---|---|---|
| EP | 0052413 A | 5/1982 |
| RU | 2000703 C | 10/1993 |

\* cited by examiner

Primary Examiner—Lien Tran
(74) Attorney, Agent, or Firm—Annette M. Frawley; John A. O'Toole; Janal M. Kalis

(57) ABSTRACT

A brown sugar substitute is disclosed. The brown sugar substitute comprises sucrose crystals, a fat and molasses. In one embodiment, the sucrose crystals are coated with the fat and the fat coated sucrose crystals are coated with molasses.

14 Claims, 12 Drawing Sheets

DRY MIX CONTAINING BROWN SUGAR SUBSTITUTE

BACKGROUND OF THE INVENTION

The present invention relates to food products and to their methods of preparation. More particularly, the present invention relates to a brown sugar substitute and to a method for making the brown sugar substitute, to an edible cookie premix, and to a kit for making cookies.

Production of brown sugar begins with harvest of sugar cane and extraction of sugar from the cane. In some instances, production of brown sugar begins with a harvest of sugar beets. In order to harvest sugar cane, sugar cane stocks are cut and are stripped of leaves. The stripped sugar cane stocks are transported to a sugar mill where cane juice is extracted from the sugar cane stocks by crushing, shredding, and passing the crushed and shredded cane stocks through a series of heavy rollers. The extracted cane juice is boiled and clarified, producing a thick syrup. The thick syrup is placed in a centrifuge and is processed until sugar crystals, which are known as raw cane sugar, and dark thick molasses, are obtained.

For some applications, the raw cane sugar is shipped to a sugar refinery, where it is washed to remove the molasses. The sugar is then dissolved into a sugar syrup. After filtering or other processing to remove impurities and/or any remaining coloring agents, the sugar is crystallized by boiling in vacuum pans. The crystallized sugar is then washed and centrifuged until granulated white sugar is produced.

At this stage, brown sugar is extractable from the sugar syrup. The brown sugar remains after the granulated white sugar has been removed. The brown sugar comprises fine crystals of white sugar covered with a film of colored and highly refined molasses-flavored syrup. In other brown sugar process embodiments, it is common to continue the refining process until all white sugar has been obtained. The white sugar is then mixed with molasses syrup in varying quantities in order to obtain a product which comprises fine crystals of sugar that are brown due to covering with a film of molasses-flavored syrup.

Molasses used in brown sugar production is also derived from cane sugar and beet sugar and may be sulfured or unsulfured. Edible molasses is, however, derived only from cane sugar. Beet molasses has an unpleasant odor and a bitter flavor and is not edible. Unsulfured molasses is produced from pure cane syrup and is preferred for some applications because of its lighter color and milder flavor. Sulfured molasses contains sulfur dioxide. The sulfured molasses is darker and has a strong bitter flavor.

Once produced, brown sugar is graded as yellow sugar, light brown sugar, or dark brown sugar. The flavor of the molasses constituent is more distinguishable in the darker brown sugars than in the yellow or light brown sugars.

Light brown sugar contains about 3.5 percent molasses. Dark brown sugar contains about 6.5 percent molasses. Brown sugar may have a molasses component in a concentration range of 8 to 10 percent. The molasses adds moisture and a distinctive flavor to the dark brown sugar.

Because of its crystal size, color and flavor, brown sugar is a desirable ingredient in baked and cooked foods such as peanut butter cookies and chocolate chip cookies. Brown sugar is also a desirable substitution for refined sugar in some cooked and baked food products. However, because brown sugar has an added moisture content, due to the molasses, brown sugar is susceptible to drying and forming lumps during storage because of a localized loss of the moisture in a stored brown sugar mass. In particular, air pockets in stored brown sugar facilitate lump formation.

The lumps are difficult to eliminate when the brown sugar is blended into a cookie dough or a muffin dough. Cookies or muffins baked from dough containing lumps have pockets of hard, unreacted brown sugar within the cookie or muffin or on the surface of the baked cookie or muffin. These hard particles are undesirable to consumers.

Attempts have been made to firmly pack brown sugar in order to remove air pockets which tend to encourage drying and hardening. These attempts have not been consistently and predictably successful.

Attempts have also been made to prevent lump formation in types of sugars other than brown sugar. For instance, powdered sugar is made by grinding granulated sugar crystals through varying degrees of fine screens. Powdered sugar is widely available in three degrees of fineness: 10x is the finest and most common; 6x and 4x are progressively coarser. A size of 12x is used in frostings. Because of powdered sugar's tendency to lump, 3 percent cornstarch, or flour or wheat starch in a concentration of 2 to 5% is added to absorb moisture and prevent lumping.

Another attempt to reduce lumping is described in the Baum et al. patent, U.S. Pat. No. 3,698,917, which issued Oct. 17, 1972. This patent describes a process for making a free-flowing powdered sugar. The process includes spraying powdered sugar with melted shortening so that the sugar contains 3 to 40% by weight of shortening.

The Jaconelli patent, U.S. Pat. No. 4,013,482, which issued Mar. 22, 1977, uses a different approach entirely and describes a process for making a dry, solid molasses in order to simulate a brown sugar. The process includes cooling molasses in a thin layer and precrushing the cooled molasses to form coarse particles and reducing the particle size.

These attempts to reduce or bypass the problem of lumping are not generally applicable to brown sugar because brown sugar lumping is related to a localized drying out of the brown sugar rather than a localized addition of moisture. There is then a need for an inexpensive ingredient that has the flavor and appearance of brown sugar but that does not form lumps in storage or when added to a dough or batter.

DESCRIPTION OF DRAWINGS

While not essential to describing the present invention to one skilled in the art, the photographic views included herein are presented in conjunction with specific examples to provide a visualization of what is verbally described in the examples.

SUMMARY OF THE INVENTION

In its product aspect, one embodiment of the present invention provides a brown sugar substitute comprising sucrose crystals, a fat and molasses wherein the fat substantially coats the sucrose crystals. The molasses contacts the fat coated crystals.

The present invention further provides a dry mix for baked goods essentially comprising the brown sugar substitute and flour.

In its article aspect, articles are provided comprising an air tight pouch wherein the dry mix is disposed therein.

Another product aspect of a brown sugar substitute comprises a viscous solution of molasses and corn syrup or molasses and maple syrup, which is applied to sucrose crystals that have been coated with a fat.

The present invention further provides methods for preparing such brown sugar substitutes. A process aspect comprises a method for making a brown sugar substitute. The method comprises providing sucrose crystals, and blending the sucrose crystals with a fat such as shortening or oil. Molasses is then added to the blended sucrose crystals and fat so that the molasses is thoroughly mixed and so that there are no "fish eyes" or "shot balls."

The present invention further provides methods for making dry mixes for cookies comprising the brown sugar substitutes and the flour. The methods comprise a first step of admixing sucrose crystals and a fat to form fat coated sucrose crystals. Molasses is admixed with the fat coated sucrose crystals to form a brown sugar substitute. Flour is admixed with the brown sugar substitute to form the dry mix.

DETAILED DESCRIPTION

In its product aspect, one embodiment of the brown sugar substitute of the present invention comprises a mixture of extra fine grind sucrose crystals coated with fat, especially shortening or hydrogenated soybean oil, and molasses to form a brown sugar substitute. The mixture is prepared, as illustrated schematically at 10 in FIG. 1, by blending the sucrose crystals with the fat so that the fat is spread over the surface of the sucrose crystals and substantially coats the crystals, as shown schematically at 12. Any sucrose crystal fines in the sugar are incorporated into the fat.

Figure 1:
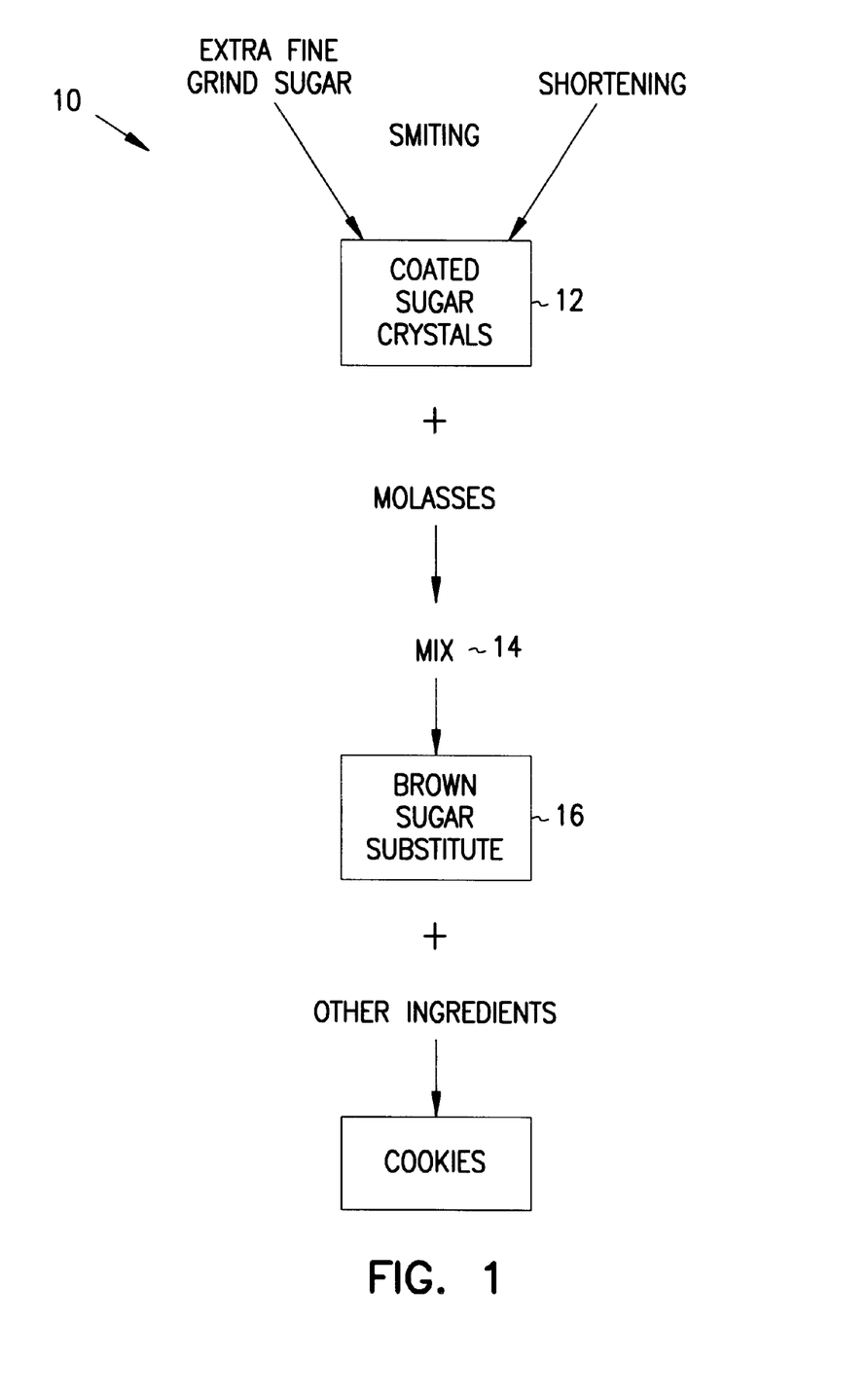
FIG. 1 is a schematic illustration of one embodiment of process steps for making the brown sugar product of the present invention and for making cookies using the brown sugar product.

The sucrose crystal coating is performed by mechanical mixing such as is used in finishing or smizing to form the fat coated sucrose crystals. The fat coated sucrose crystals are subjected to high shear, such as is generated by a ribbon mixer. Good results are obtained when the mixing step is practiced for about one to five minutes. Once the fat has been thoroughly spread over the sucrose crystals and coats the crystals, the molasses is added, as shown at 14. Molasses is added to the fat coated sucrose crystals and is blended.

It has surprisingly been found that coating the sucrose crystals with fat prior to mixing with molasses prevents a formation of lumps in the brown sugar substitute. This tendency to lump is prevented even in the presence of humectant ingredients such as peanut butter, in a dry mix or dough formulation, which draws moisture from the surrounding environment. This absence of lumping is contrary to what occurs when conventional brown sugar contacts peanut butter. Drying and lumping of conventional brown sugar is actually enhanced by humectant materials such as peanut butter.

Because the brown sugar substitute is free of lumps, the brown sugar substitute can be used to make a baked good such as a cookie or muffin that is free of hard particles of brown sugar lumps. The brown sugar substitute can then be used to reliably mass produce high quality cookies and muffins.

It has also surprisingly been found that coating the sucrose crystals with fat prior to mixing with molasses prevents a formation of "shotballs", "fish eyes" and "glassy" pieces in the brown sugar substitute 16. The terms "fish eyes"and "shotballs" as used herein refer to balls of very viscous molasses-based material that does not blend to make a homogeneous mixture. "Fish eyes", "shotballs", and "glassy" pieces are produced when pockets of molasses and sucrose crystals combine with excess crystal fines in a mixing process to produce a substantially transparent piece that has a "glass-like" appearance and that is extremely resistant to mixing into a dough or a batter. "Glassy pieces" are distinguishable from "fish eyes" and "shotballs" because "glassy pieces" have angular shapes. "Fish eyes" and "shot balls" have rounded shapes.

The term "smizing" as used herein refers to submitting the sucrose crystal-fat mixture to a high shear, such as with a ribbon mixer.

The term "sugar" as used herein refers to sucrose or sucrose crystals.

Conventional brown sugar typically has a molasses concentration range of about 3 to 10 percent and a sucrose crystal concentration range of 90 to 92 percent. Unlike conventional brown sugar, the brown sugar substitute of the present invention includes sucrose crystals and fat that coats the sucrose crystals. The brown sugar substitute has a sucrose crystal to fat ratio that is about 38 parts sucrose crystals to 13 parts of fat on one end of the concentration spectrum. The sucrose crystal to fat concentration is about 40 parts of sucrose crystals to about 2.7 parts of fat by weight of the total mixture, at the lower concentration spectrum. In other words, for a mixture of about 40 percent flour and 40 percent sucrose crystals, the fat concentration is at least, about 2.7 percent of the total mixture.

The fat can be employed in a solid form, such as is a cube form, characterized by a size of about 1 cubic centimeter, which is plasticized, or in a votated form which is plasticized. The plasticized fat has a semi-firm consistency. Oil is also usable as a fat in the brown sugar substitute of the present invention. The solid form fat or oil temperature ranges from about 85° F. to about 1600 ° F.

A fat suitable for use in the present invention is a plastic shortening with the following SFI characteristics, as measured by an American Oil Chemists Society, AOCS, dilometric method:

| Temperature (° F.) | SFI |
|---|---|
| 50 | 33 |
| 70 | 25 |
| 80 | 23.5 |
| 92 | 18.5 |
| 104 | 12.5 |

The composition of the shortening includes hydrogenated soybean oil.

Another acceptable fat is a soybean oil with the following SFI characteristics:

| Temperature (° F.) | SFI |
|---|---|
| 50 | 51.1 |
| 70 | 40.1 |
| 80 | 23.5 |
| 92 | 18.5 |
| 104 | 4.0 |

One other acceptable fat is a soybean oil that has a melting point of 103 to 119° F. and is a partially hydrogenated soybean oil.

The sucrose crystals and fat are mixed together until there are no free, dry pieces of sucrose crystals within the mixture. This mixing or spreading is performed by a mechanical device or by finishing or smizing.

The fat is spread over the surface of the large sucrose crystals and substantially coats the sucrose crystals. Any fines in the sucrose crystals are incorporated into the fat. This physical condition is achieved within about five minutes of mixing. A determination of whether there are free dry pieces of sucrose crystals in the brown sugar substitute is a visual determination.

The sucrose crystals used in the product of the present invention, for one embodiment, have the granulation characteristics described herein. The granulation was measure with a Rotap, manufactured by Tyler RoTap, of Mentor Ohio. The Rotap includes a shaker mechanism and a sieve stack positioned on the shaker mechanism. Each sieve of the sieve stack includes a mesh screen that defines openings of a designated size in microns.

The RoTap shaker mechanism mechanically reproduces the circular motion that occurs during hand sieving, while, at the same time, taps the sieve stack in order to assist particles falling through mesh screens of the sieves. Sieves used for this test were U.S. Standard sieves having sieve numbers of 30, 35 and 80. Sucrose crystals were added to the No. 30 standard sieve and were shaken for 12 minutes on the RoTap. A hammer component on the Rotap was positioned down, a position that held the sieves in place and that tapped the sieve stack. At the conclusion of 12 minutes, the RoTap was stopped and sucrose crystals retained on each of the sieves in the stack were weighed. Results were as follows:

| Weight % Retained | U.S. Standard Sieve No. |
|---|---|
| 15% maximum on | 30 |
| 25% maximum on | 35 |
| 15% maximum through | 80 |

One other acceptable sucrose crystal embodiment had a 70% particle retention on a No. 100 U.S. Standard sieve, as measured by shaking a Ro Tap device for 12 minutes. Another acceptable sugar embodiment had an 80% particle retention on a No. 100 sieve.

It has been found that sugar with the following granulation is not acceptable because the granulation is too fine:

| Wt % through | U.S. Standard Sieve No. |
|---|---|
| 53% through | 325 |
| 20% on | 100 |
| 13% on | 70 |

With this granulation, 53% of sucrose crystals passed through a U.S Standard sieve having a size of 325. A quantity of 20% of sucrose crystals passed through a U.S. Standard sieve having a size of 100. A quantity of 13% of sucrose crystals were retained on a U.S. Standard sieve having a size of 70. This granulation of sucrose crystals has a fines concentration that is too high and that produces cookies with speckled tops. The speckled tops are due to a formation of fish eyes and shotballs.

One other parameter for measuring sucrose crystals is crystal area, CS. Sugars with a crystal area, CS, within a range of 0.036 to 0.046 $m^2/cm^3$ have been found to produce cookies having desirable features. Sucrose crystals comprising cake sugars with a larger CS, of 0.100 $m^2/cm^3$ produced unacceptable cookies. Sucrose crystals comprising modified cake sugars with a CS of 0.050 $m^2/cm^3$ also produced unacceptable cookies.

Using the acceptable sucrose crystals as described herein reduces fines in sucrose crystals that are used to make the brown sugar substitute. A reduction in fines reduces formation of fish eyes and also reduces glass formation by the sugar and molasses. Coating the sucrose crystals with fat in a first mixing step ties up any fines in the sucrose crystals that have been generated by crystals rubbing against each other and by rubbing against the walls of the conveyers. Only after the fat has been thoroughly spread over the sucrose crystals and has incorporated the fines, is the molasses introduced.

Molasses is added to the sucrose crystal- fat mixture at temperatures ranging from a temperature of about 90 ° F. to about 120 ° F. One type of molasses employed is a medium brown molasses, and has the following characteristics:

| Viscosity | 50° F. | 30,600 centipoise | centipoise = centistoke x density |
|---|---|---|---|
| | 60° F. | 17,750 | |
| | 70° F. | 8,100 | density = 11.7 lbs per gal |
| | 80° F. | 5,100 | flavor = strong molasses |
| | 90° F. | 3,600 | color = medium brown |
| | 100° F. | 2,200 | |
| | 110° F. | 1,400 | |
| | 120° F. | 850 | |

-continued

| | | |
|---|---|---|
| Brix | 79.5 | Spindle, AOAC; 5th Ed. 932.14A |
| Specific Gravity | 1.41 for 70° F. and 80° F.<br>1.40 for 90° F. and 100° F.<br>1.39 for 110° F. and 120° F. | |
| Composition | pH of 5.0–6.0 | ITD Method #21-03 |
| | Ash of 7.0%–10.0% | AOAC; 15th Ed. 900.02C |
| | Sucrose = 33.0%–39.0% | AOAC; 15th Ed. 930.36 |
| | Reducing Sugars of 17.0%–23.0% | AOAC; 15th Ed. 923.09 |
| | Total sugars = 53.0%–59.0% | Sucrose + Reducing Sugars |
| | Solids = 79.0%–80.0% | Spindle, AOAC; 15th Ed. 932.14A |

The molasses can be and preferably is added with mixing using a metering pump to closely control the amount of molasses, at a temperature of about 90F to 120 ° F. In one embodiment, the molasses is mixed at high shear for a desired distribution. The desired distribution results in a smooth distribution of all ingredients. The molasses is added so that the ratio is about 1 part molasses to about 20 parts of sucrose crystals and fat.

Molasses applied to the sucrose crystals coated with fat produces a brown sugar that does not have "glassy pieces." Molasses that is properly distributed on the sucrose crystals produces a brown sugar substitute that is free of "fish eyes" and "shot balls". As discussed, once "fish eyes", "shot balls" or "glass pieces" are formed, they are substantially impossible to eliminate.

Figure 3:
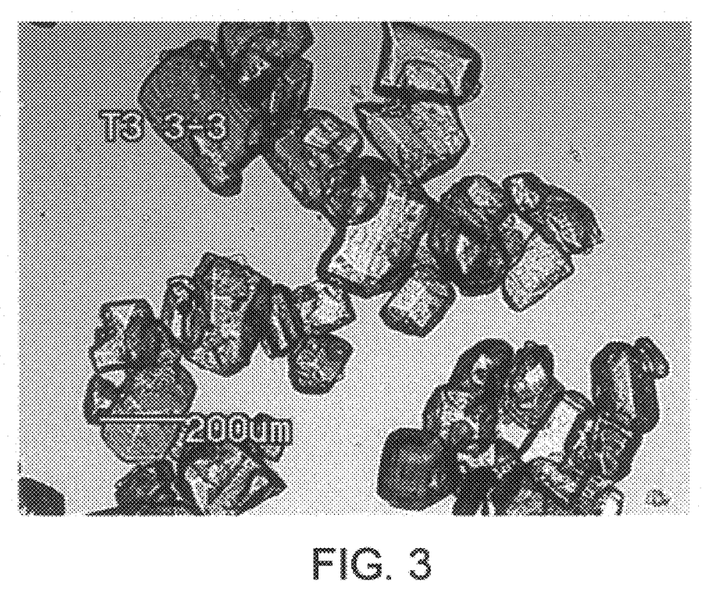
FIG. 3 is a top plan photographic view of another embodiment of a sugar, shortening, molasses mixture of the present invention.
Figure 4:
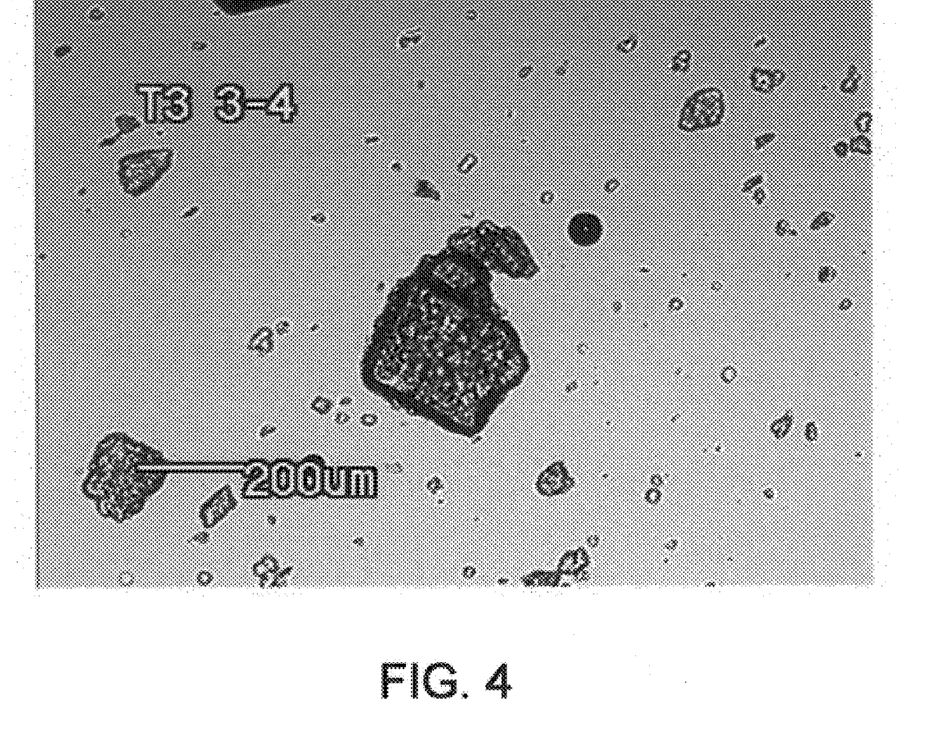
FIG. 4 is a top plan photographic view of one other embodiment of a sugar, shortening, molasses mixture of the present invention, illustrating binding of fines.
Figure 11:
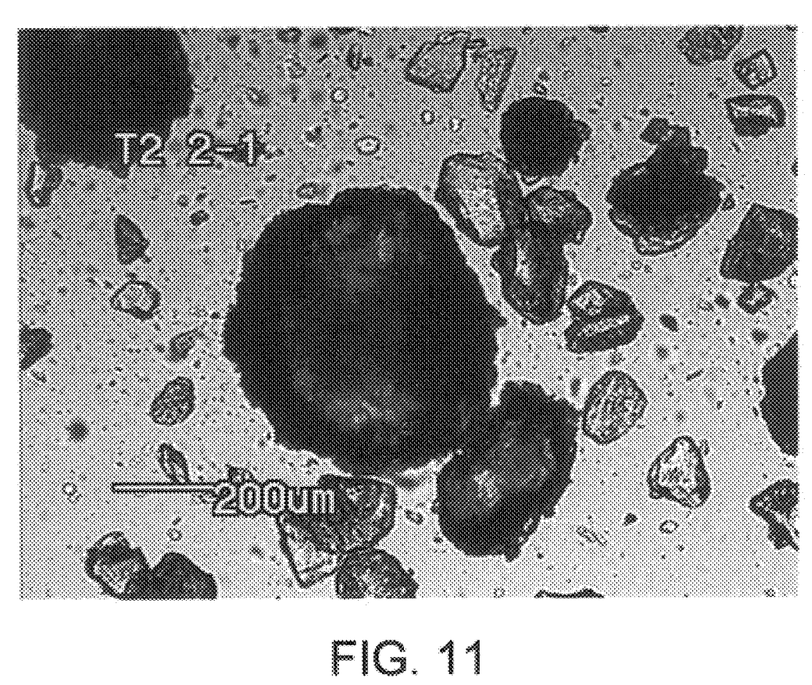
FIG. 11 is a top plan view of crystals in a sugar-shortening blend prepared at an elevated temperature.

Molasses is added to the sucrose crystal-fat mixture, thereby changing the color of the mixture to a color that is slightly darker than amber. Views of the sucrose crystal particles when coated with fat and molasses, are shown in FIGS. 3, and 4. FIGS. 3 and 4, in particular, show a binding of fines to larger sucrose crystals. This fines binding does not occur when using fine grinds of sucrose crystals, such as is shown in FIG. 11.

Figure 6:
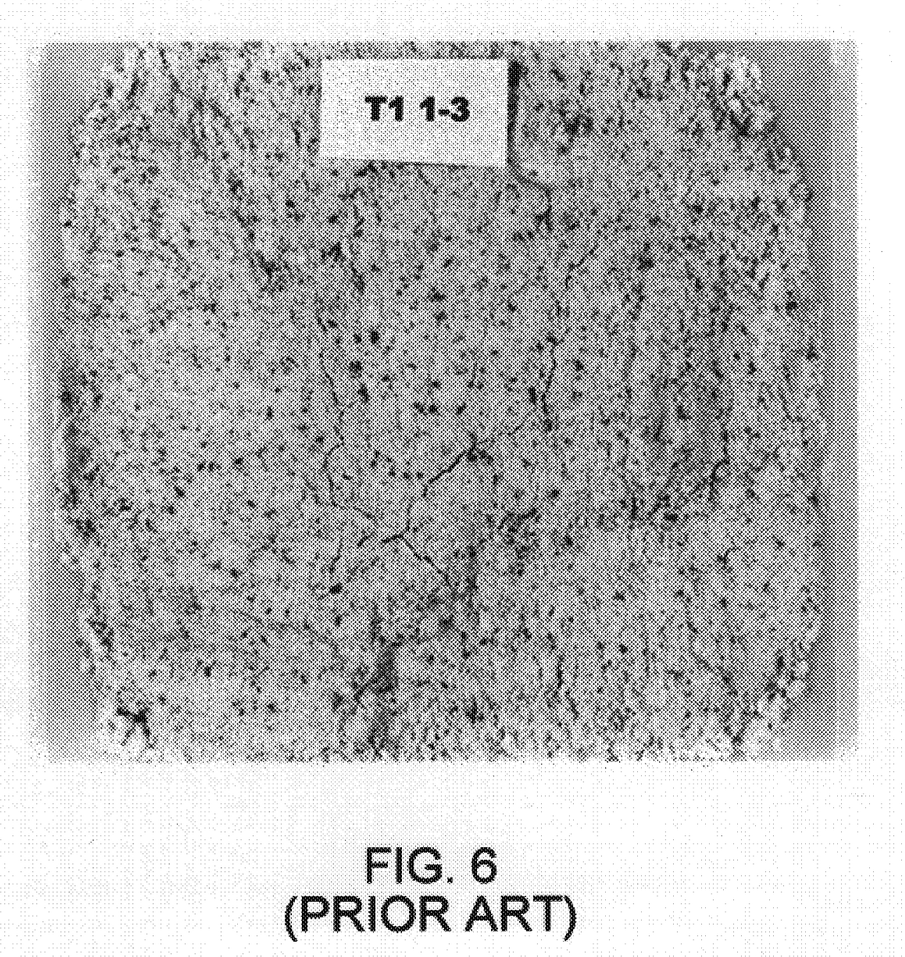
FIG. 6 is a top plan photographic view of one prior art dry mix embodiment of the present invention, the dry mix comprising brown sugar.
Figure 7:
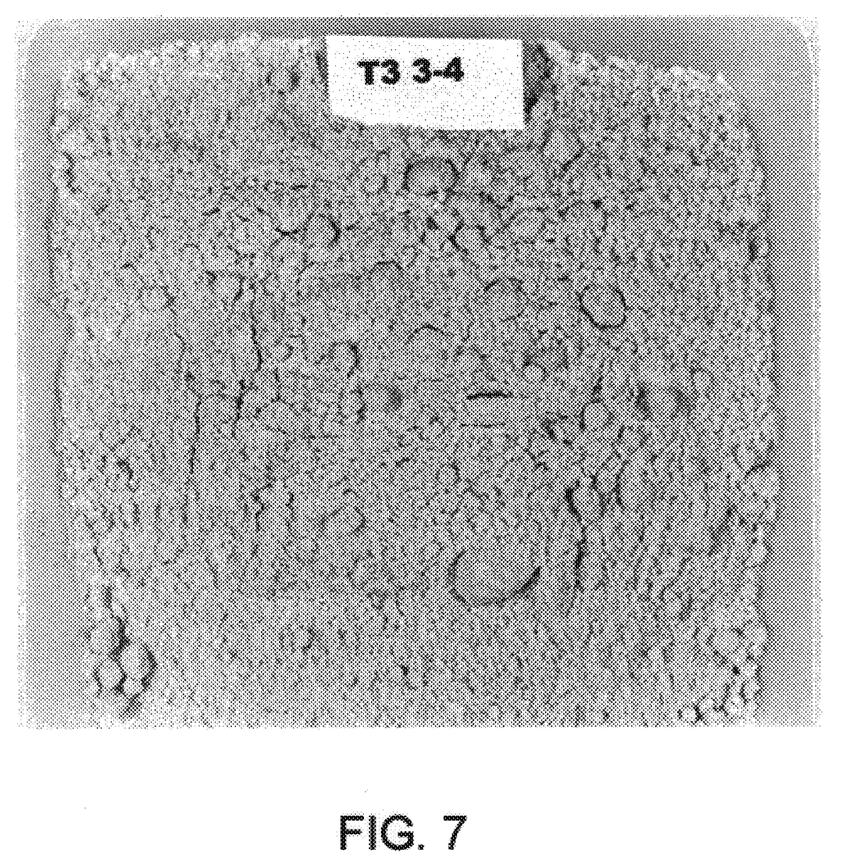
FIG. 7 is a top plan photographic view of one dry mix embodiment, the dry mix comprising the brown sugar substitute of the present invention.

Once the molasses is blended with the sucrose crystals and fat to form the brown sugar substitute of the present invention, other dry mix ingredients can be admixed for some embodiments, to form a dry mix. One cross-sectional view of the dry mix embodiment of the present invention is shown in FIG. 6. This dry mix preparation is substantially free of lumps, unlike a prior art dry mix made with conventional brown sugar as is shown in FIG. 7. Other dry mix ingredients in the dry mix include flour, salt, supplemental fat, milk solids, and emulsifiers.

This dry mix product, so prepared, can be, for some embodiments, packaged and sold to a consumer as a packaged consumer foods article. The consumer uses the dry mix to make a finished baked dessert, such as peanut butter cookies or sugar cookies or chocolate chip cookies by admixing the dry mix with margarine and egg or butter and water to form a bakable batter or dough. The dry mix is preferably stored in pouches or other containers that are substantially impervious to air.

Figure 8:
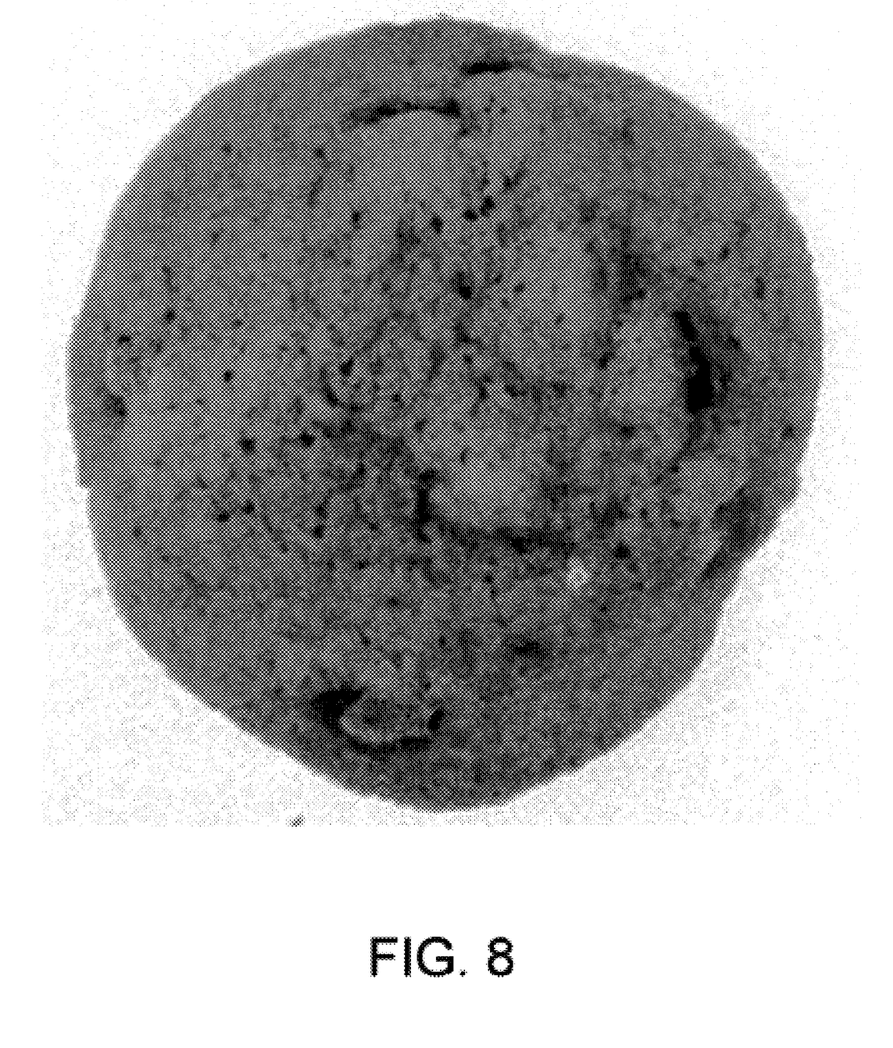
FIG. 8 is a top plan view of a baked cookie made with the dry mix of the present invention.
Figure 9:
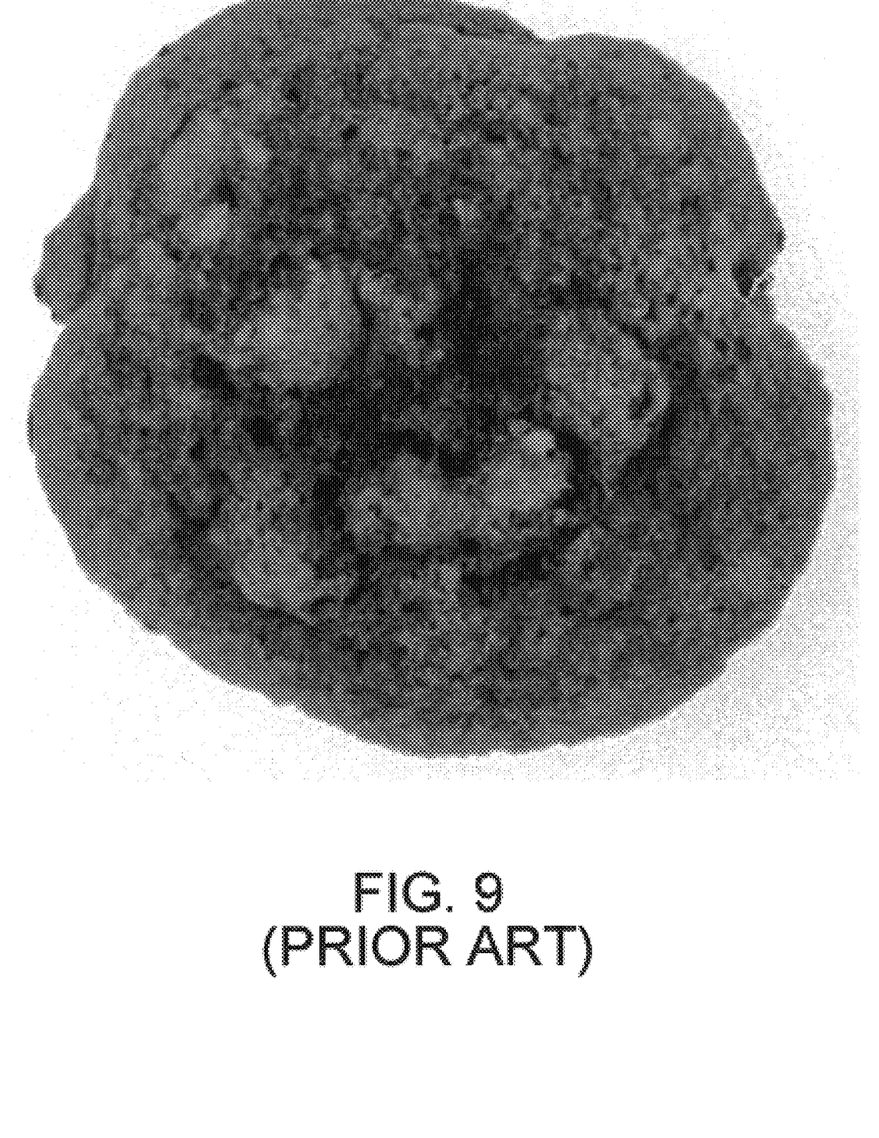
FIG. 9 is a top plan view of a prior art cookie made with dry mix comprising brown sugar.

The brown sugar substitute of the present invention can be used as an ingredient in a wide variety of dry mixes for baked goods in the preparation of mixes and premixes for chocolate chip cookies, oatmeal chocolate chip cookies, oatmeal cookies, chocolate chip muffins, and peanut butter cookies. One cookie embodiment, made with the brown sugar substitute and dry mix of the present invention is shown in FIG. 8. This cookie displays greater uniformity than a prior art cookie make with conventional brown sugar, as shown in FIG. 9.

One other embodiment of the present invention comprises finely ground sucrose crystals which have been coated with molasses in a concentration of about two percent by weight. The molasses and sucrose crystals are blended to form a mixture. This brown sugar substitute is also stored in a pouch or other substantially airtight container. This brown sugar substitute is usable as a topping for a material such as hot cereal.

Another brown sugar substitute embodiment includes sucrose crystals in a syrup state, such as a corn syrup or a maple syrup. With this embodiment, molasses is mixed with the syrup and then the fat component is added. The fat is added as an oil.

EXAMPLE 1

Sucrose crystals of an unground sugar, manufactured by General Mills, Inc. of Minneapolis, Minn., having a CS of 0.050 $m^2/cm^3$ were blended with shortening at a temperature of 750 ° F. to form a shortening coated sucrose crystals. The shortening and sucrose crystals were admixed with shear in a ribbon blender, sometimes referred to as "smizing" to enrobe crystals of the sugar with the shortening to form a "smized" sugar. The admixing was performed for about 5 minutes. Because of the high fines concentration in the sugar, the fat did not incorporate all of the fines.

A small quantity of molasses was then added to the smized sugar-shortening blend to form molasses coated smized sugar. Blending and smizing were performed for about 2 minutes to add the molasses and for one additional minute after the molasses was added. Flour and other ingredients identified below were then added by blending and smizing for about 5 minutes to form a bakable cookie dough. The dough was then formed into unbaked chocolate chip cookies and baked.

For all embodiments described to form finished cookies, in Examples 1–4 herein, a mixture of about 343 grams of molasses coated smized sugar were prepared. A quantity of 160 grams of chocolate chips was added to the mixture. A quantity of 50 grams of egg and 113 grams of margarine were added to make a dough. The dough was sized to form about 24 cookies which were baked at 375° F. for 10 minutes.

Figure 10:
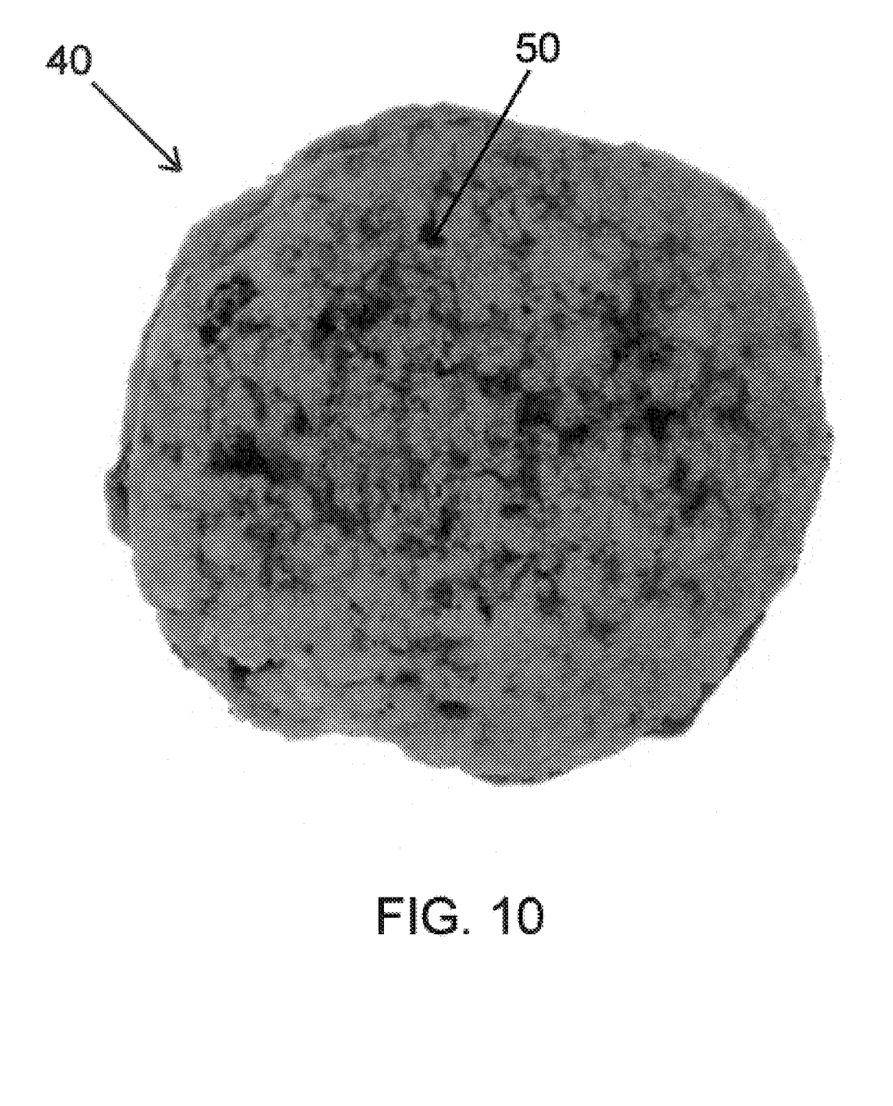
FIG. 10 is a top plan view of a cookie made with a sugar having a crystal size of 0.050 m²/cm³.

A cookie produced is illustrated in FIG. 10. As can be seen, the cookie 40 has a speckled top due to fines in the sugar collecting with molasses to form molasses balls. The molasses balls form surface specks 50 in the cookie.

EXAMPLE 2

A brown sugar substitute of the present invention was prepared as follows. Sucrose crystals of an unground sugar, manufactured by General Mills, Inc., having a CS of 0.050 $m^2/cm^3$, was heated to 115° F. Shortening having a temperature of 140° F. was blended and smized with the sugar for 5 minutes. The result was formation of shortening coated sucrose crystals, "smized sugar" at a temperature of about 117.6° F. Shortening coated sucrose crystals are shown in FIG. 11.

Figure 12:
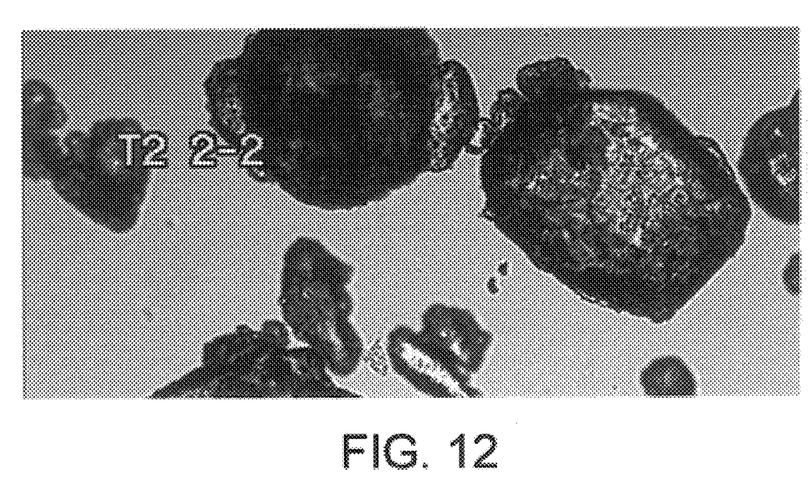
FIG. 12 is a top plan view of crystals in the sugar-shortening blend of FIG. 11, with an addition of molasses at an elevated temperature.

A small quantity of molasses having a temperature of about 115.6° F. was added to the shortening coated sucrose crystals. The molasses was blended and smized for about 3 minutes to add the molasses and about 2 minutes of additional blending and smizing to form the brown sugar substitute. Sucrose crystals coated with molasses blend are shown in FIG. 12.

Figure 13:
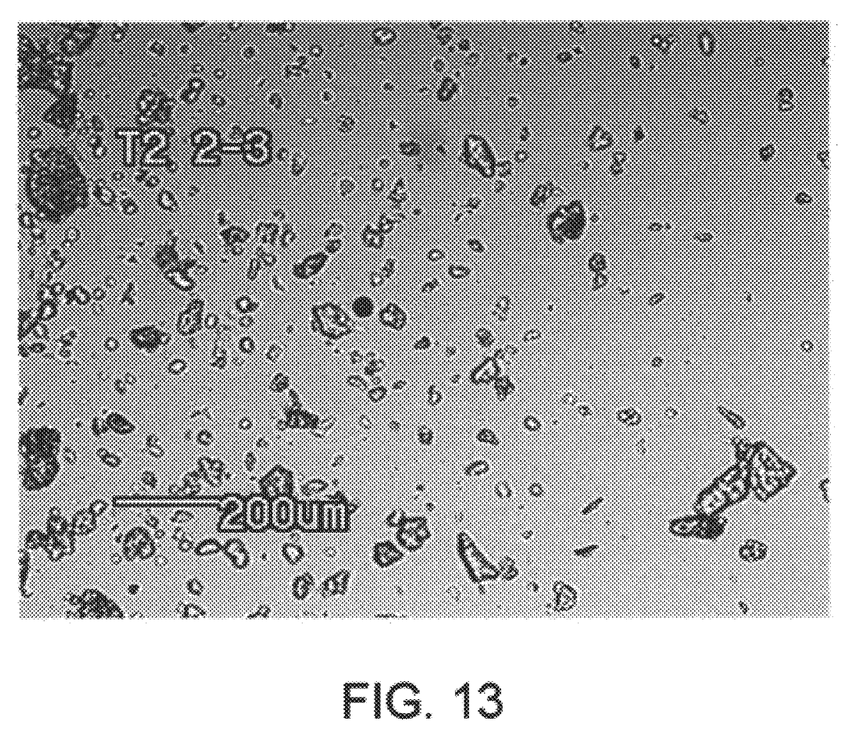
FIG. 13 is a top plan view of crystals of the sugar-shortening-molasses blend of FIG. 12 are additionally blended with flour and other ingredients.

A dry mix of the present invention was also prepared. Flour and minors were added to the brown sugar substitute at a temperature of about 98.9° F. The flour and minors were blended and smized for about 5 minutes. Crystals from this mixture are shown in FIG. 13.

Figure 14:
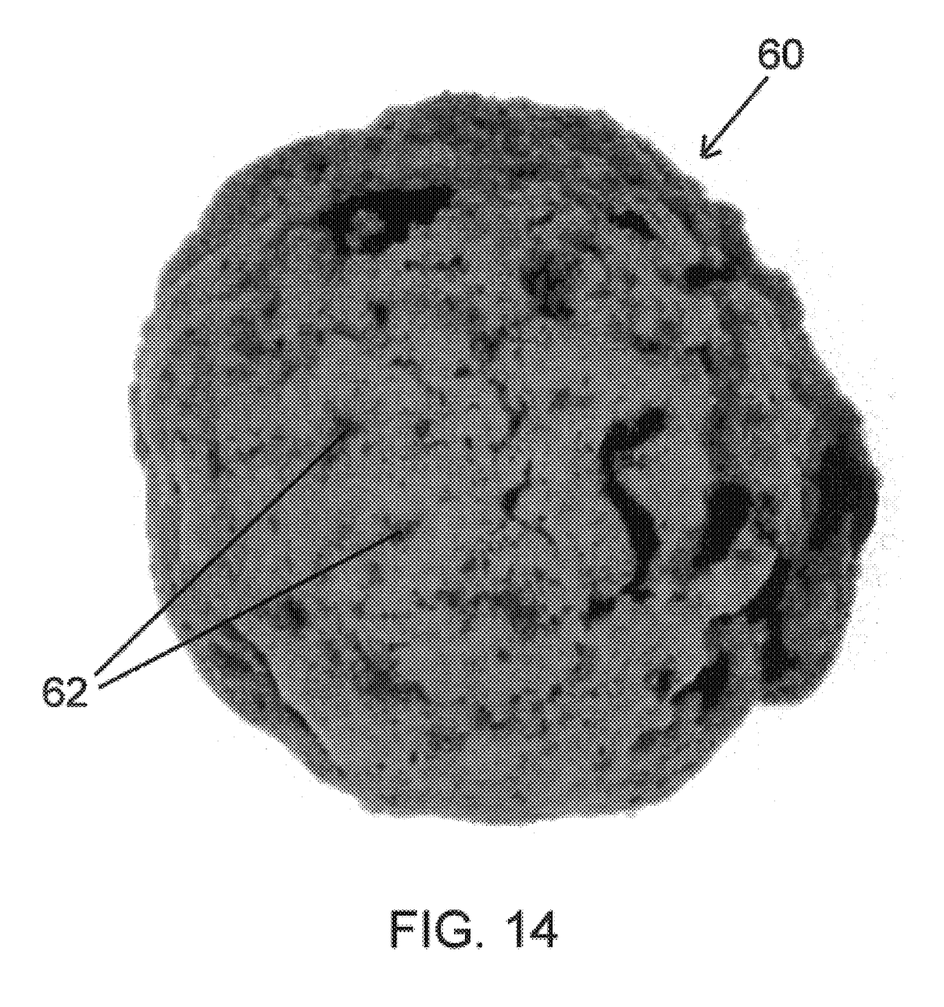
FIG. 14 is a top plan view of a cookie made from the crystal blend of FIG. 13.

A finished baked cookie 60 as described in Example 2, is shown in FIG. 14. The cookie is a chocolate chip cookie that also has a speckled top, as shown at 62. The specks are caused by sucrose crystal fines collecting with molasses to form molasses balls. The molasses balls appear as surface specks.

EXAMPLE 3

Figure 2:
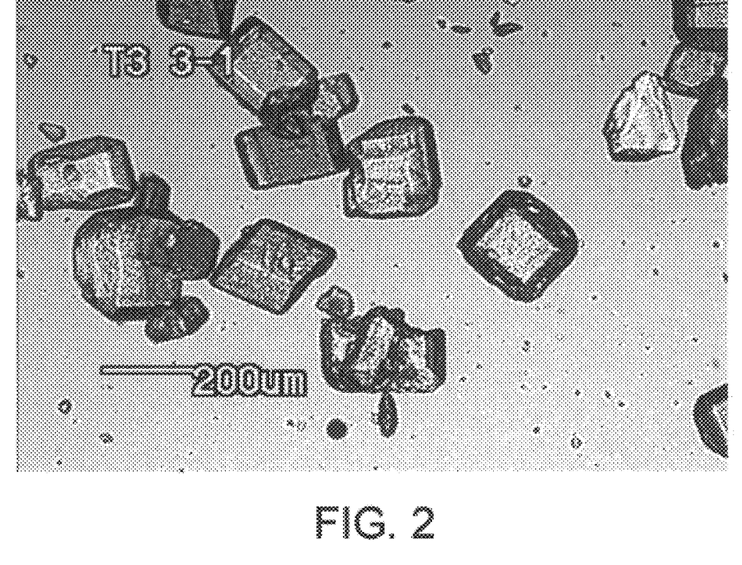
FIG. 2 is a top plan photographic view of one embodiment of a sugar mixture of the present invention.

Sucrose crystals of a sugar, manufactured by General Mills, Inc., of Minneapolis, Minn., having a CS of 0.036 $m^2/cm^3$ was used. The sugar had a temperature of about 75° F. Crystals from this sugar are shown in FIG. 2.

Shortening was blended with the sugar crystals by blending and smizing for about 5 minutes to form a sugar-shortening blend. The shortening coated the sucrose crystals. A small amount of molasses was added to the sugar-shortening blend by blending and smizing for about 3 minutes during molasses addition and for an additional minute, forming molasses and shortening coated sucrose crystals, the brown sugar substitute of the present invention. Examples of these crystals are shown in FIG. 3. Flour and other minor ingredients were added to the molasses-sugar-shortening blend. Crystals formed after this addition are shown in FIG. 4.

A baked chocolate chip cookie formed by the brown sugar substitute is shown in FIG. 8. With this method embodiment, the molasses spreads evenly over the sugar-shortening blend. The consequence is that the baked cookie has very few molasses balls and has an excellent overall quality.

EXAMPLE 4

Figure 5:
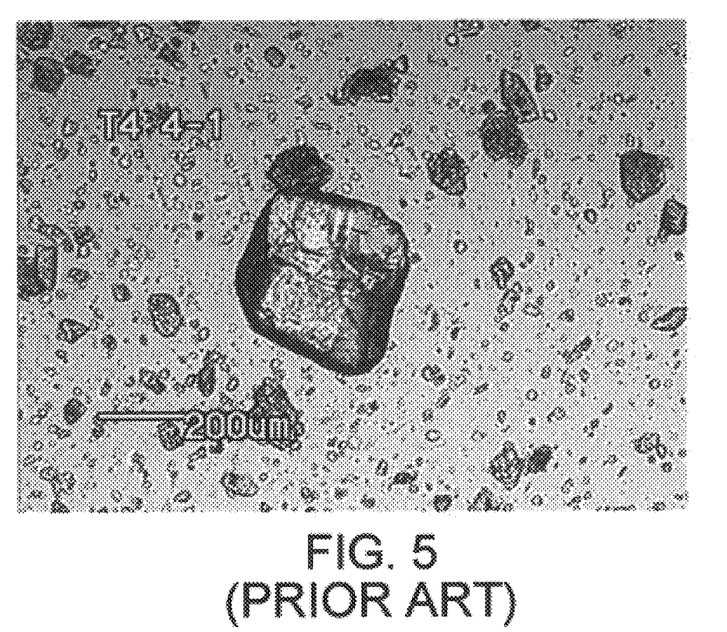
FIG. 5 is a top plan photographic view of a prior art embodiment of a sugar, flour and shortening mixture.
Figure 5A:
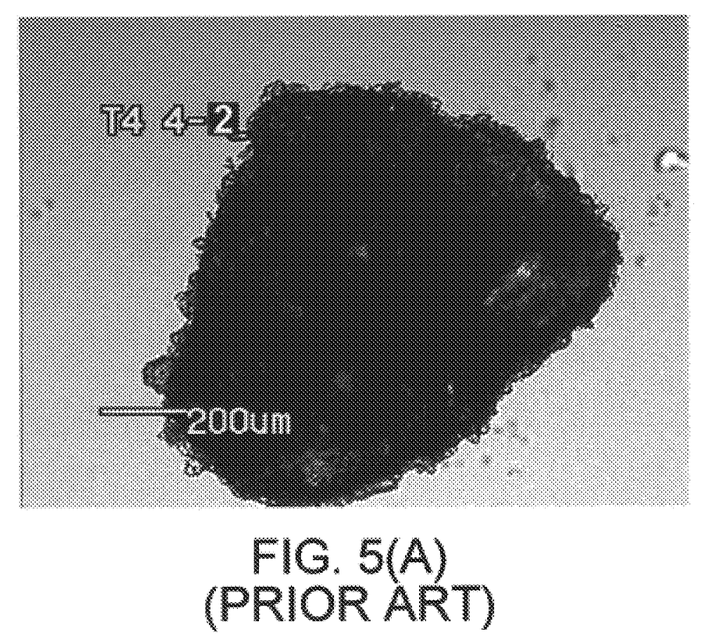
FIG. 5A is a top plan view of the prior art mixture of FIG. 5 with a brown sugar component.

For this control embodiment, an unground sugar was blended with flour and minor ingredients for about 5 minutes at about 750 ° F. The sugar had a CS of 0.050 $m^2/cm^3$. Shortening was added and the mixture was blended and smized for about 5 minutes. Crystals in this mixture are shown in FIG. 5. Brown sugar was then added to the mixture. Crystals in this brown sugar mixture are shown in FIG. 5A.

As can be seen, the interaction of conventional brown sugar crystals and other ingredients is very different from the interaction of the brown sugar substitute of the present invention. The conventional brown sugar does not display the crystal binding that is shown by the coated sucrose crystals of the brown sugar substitute. Thus, the brown sugar substitute consistently and predictably produces a good quality dough or baked good, free of lumps and "fish eyes", "shotballs", and "glassy pieces" by a mechanism very different from what occurs with conventional brown sugar.

A chocolate chip cookie made with the control mixture is shown in FIG. 9. The cookie is of good quality and has very few specks. However, as discussed, this outcome is not consistently produced with conventional brown sugar.

Thus, since the invention disclosed herein may be embodied in other specific forms without departing from the spirit or general characteristic thereof, some of which forms have been indicated, the embodiments described herein are to be considered in all respects illustrative and not restrictive. The scope of the invention is to be indicated by the appended claims, rather than by the foregoing description, and all changes, which come within the meaning and range of equivalency of the claims, are intended to be embraced therein.

What is claimed is:

1. A dry mix for baked goods, comprising:
   sucrose-based particles, each sucrose-based particle, comprising:
   a sucrose crystal;
   a fat that coats the sucrose crystal; and
   molasses that coats the fat-coated crystal.
2. The dry mix of claim 1 and further comprising flour.
3. The dry mix of claim 1 and further comprising an emulsifier.
4. The dry mix of claim 1 and further comprising peanut butter.
5. The dry mix of claim 1 and further comprising chocolate chips.
6. The dry mix of claim 1 and further comprising raisins.
7. The dry mix of claim 1 and further comprising salt.
8. The dry mix of claim 1 and further comprising a substantially air tight container wherein the dry mix is contained within the container.
9. The dry mix of claim 8 wherein the container is a pouch.
10. The dry mix of claim 1 wherein the baked goods comprise cookies selected from the group of cookies that include oatmeal, oatmeal chocolate chip, chocolate chip, peanut butter, molasses, and sugar cookie premix.
11. The dry mix of claim 1 wherein the concentration of the particles in the dry mix ranges from 5 to 90 percent by weight of the dry mix.
12. The dry mix of claim 7 wherein the salt concentration is 0.5 to 4 percent by weight of the dry mix.
13. The dry mix of claim 2 wherein the flour concentration is about 5 to 30% by weight of the dry mix.
14. A particle in a dry mix for baked goods, comprising:
    a sucrose crystal, a fat that coats the sucrose crystal to form a fat-coated sucrose
    crystal; and molasses that coats the fat-coated crystal.

* * * * *